United States Patent
Fox et al.

(10) Patent No.: US 6,421,781 B1
(45) Date of Patent: *Jul. 16, 2002

(54) METHOD AND APPARATUS FOR MAINTAINING SECURITY IN A PUSH SERVER

(75) Inventors: Mark A. Fox, San Mateo; Peter F. King, Half Moon Bay; Seetharaman Ramasubramani, San Jose, all of CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/132,166

(22) Filed: Aug. 10, 1998

Related U.S. Application Data (63) Continuation-in-part of application No. 09/071,377, filed on Apr. 30, 1998, now abandoned.

(51) Int. Cl.[7] .............................. H04L 1/00; G06F 13/00
(52) U.S. Cl. ..................... 713/201; 713/200; 380/30; 380/231; 709/232
(58) Field of Search ................................. 713/200, 201; 709/232, 202, 206; 380/231, 30; 705/27, 8; 707/3, 9

(56) References Cited

U.S. PATENT DOCUMENTS

| | | | | |
|---|---|---|---|---|
| 5,774,552 A | * | 6/1998 | Grimmer | 380/25 |
| 5,893,091 A | * | 4/1999 | Hunt et al. | 707/3 |
| 5,970,475 A | * | 10/1999 | Barnes et al. | 705/27 |
| 6,035,336 A | * | 3/2000 | Lu et al. | 709/232 |
| 6,072,874 A | * | 6/2000 | Shin et al. | 380/231 |
| 6,092,194 A | * | 7/2000 | Touboul | 713/200 |
| 6,105,027 A | * | 8/2000 | Schneider et al. | 707/9 |
| 6,131,163 A | * | 10/2000 | Wiegel | 713/201 |

OTHER PUBLICATIONS

HDTP Specifiation Version 1.1, Jul. 15, 1997; Unwired Planet, 40 pages.
HDML Specifiation Version 2.0, Jul. 1997; Unwired Planet, 56 pages.

* cited by examiner

Primary Examiner—Ly V. Hua
(74) Attorney, Agent, or Firm—Blakely, Sokoloff, Taylor & Zafman LLP

(57) ABSTRACT

A secure push server is disclosed. The push server is used for sending notifications to different wireless clients on different wireless networks. The push server allows information service providers to send notifications to the wireless clients. The information service providers initiate a request to the push server that includes updated information. The request also includes a certificate from the information service provider. The push server authenticates the request from the information service provider by verifying the certificate. The push server also determines if the certificate was issued from an acceptable certificate authority by examining an acceptable certificate authority list. Finally, the push server checks the content of the notification to be sure it does not interfere with other information service providers. After performing the security checks, the push server processes the notification request.

28 Claims, 5 Drawing Sheets

METHOD AND APPARATUS FOR MAINTAINING SECURITY IN A PUSH SERVER

PRIOR PATENT APPLICATIONS

This patent application is a continuation in-part application of an earlier filed patent application entitled "Method and Apparatus for Informing Wireless Clients about Updated Information" having Ser. No. 09/071,377 filed on Apr. 30, 1998, now abandoned.

FIELD OF INVENTION

The present invention relates generally to data communications between a number of information providers and a push server across a computer network. In particular, the present invention relates to a method and apparatus for securely handling data push requests from a number of information providers to a plurality of wireless computing devices through a push server.

BACKGROUND OF THE INVENTION

The Internet is a global communication network that interconnects computers around the world using a single protocol. Together, these millions of connected computers form a vast repository of information that is readily accessible by any of the connected computers from anywhere at any time.

To provide mobility and portability to the Internet, wireless computing devices have been introduced. The wireless computing devices are capable of communicating with the computers on the Internet using wireless data networks that are connected to the Internet. With wireless computing devices using wireless data networks, people are able to travel about and yet perform the same tasks they could do with computers directly connected to the Internet.

The most common wireless access paradigm of today is a laptop personal computer equipped with a wireless communication mechanism. For example, a laptop may be equipped with a wireless modem for communication with the Internet. This paradigm may be useful for a considerable number of applications and users. However, there has been a growing need for a mobile paradigm in which the Internet can be instantly accessed by smaller mobile computing devices such as mobile phones and Personal Digital Assistants (PDAs). With increasing data processing capabilities in these new smaller mobile computing devices, more and more users are carrying such devices around to convert unproductive time into productive time.

With a small wireless Internet device, a traveler may request the departure time of a next available flight when on the way to an airport. Similarly, a trader may purchase securities while travelling in a taxi. The pertinent information from these transactions may include the airline and the flight number for the traveler, as well as the stock name, the number of shares and the price being purchased for the trader. These airline flight schedules and stock trading sites are available on the Internet. However, to access this information from a mobile device that is connected to a wireless data network, the wireless network must be coupled to the Internet. For example, the wireless data network may connect to the Internet through a proxy server that bridges Internet communication with wireless network communication. Thus, a mobile computing device user could access an airline flight information server or stock trading server through a proxy server that couples the wireless network to the Internet.

In some situations, the traveler or the trader may wish to be informed of any changes or updates to certain information without explicitly requesting the updates. For example, the traveler may wish to be informed if an airline flight schedule changes that will affect the traveler's plans. In such a situation, the traveler could subscribe to a service that notifies him if there are any updates to particular airline schedules. Thus, a "push" information delivery system that automatically distributes updates would be desirable for users of wireless computing devices. In the example of the traveler with a wireless computing device, an Internet airline scheduling server could push information to a proxy server coupled to the Internet. The proxy server would then pass the information on to the wireless computing device across a wireless communication infrastructure.

As set forth in the previous example, any computer system coupled to the global Internet could become an information provider that pushes information to wireless clients since an information provider just needs to be able to send information to a proxy server coupled to the Internet. Such an open architecture is ideal for encouraging new information service providers. However, such an open architecture is also vulnerable to attacks from malicious attackers (hackers) since any malicious attacker could also send messages to the proxy server. Therefore, it is important to provide safeguards to proxy servers coupled to the global Internet.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Notation and Nomenclature

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

The detailed description of the present invention in the following is presented largely in terms of procedures, steps, logic blocks, processing, and other symbolic representations that resemble data processing devices coupled to networks. These process descriptions and representations are the means used by those experienced or skilled in the art to most effectively convey the substance of their work to others skilled in the art. The method of the present invention along with the apparatus to be described in detail below is a self-consistent sequence of processes or steps leading to a desired result. These steps or processes are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing device that manipulates and transforms data represented as physical quantities within the computing device's registers and memories into other data similarly represented as physical quantities within the computing device or other electronic devices.

A Wireless Data Network

Figure 1:
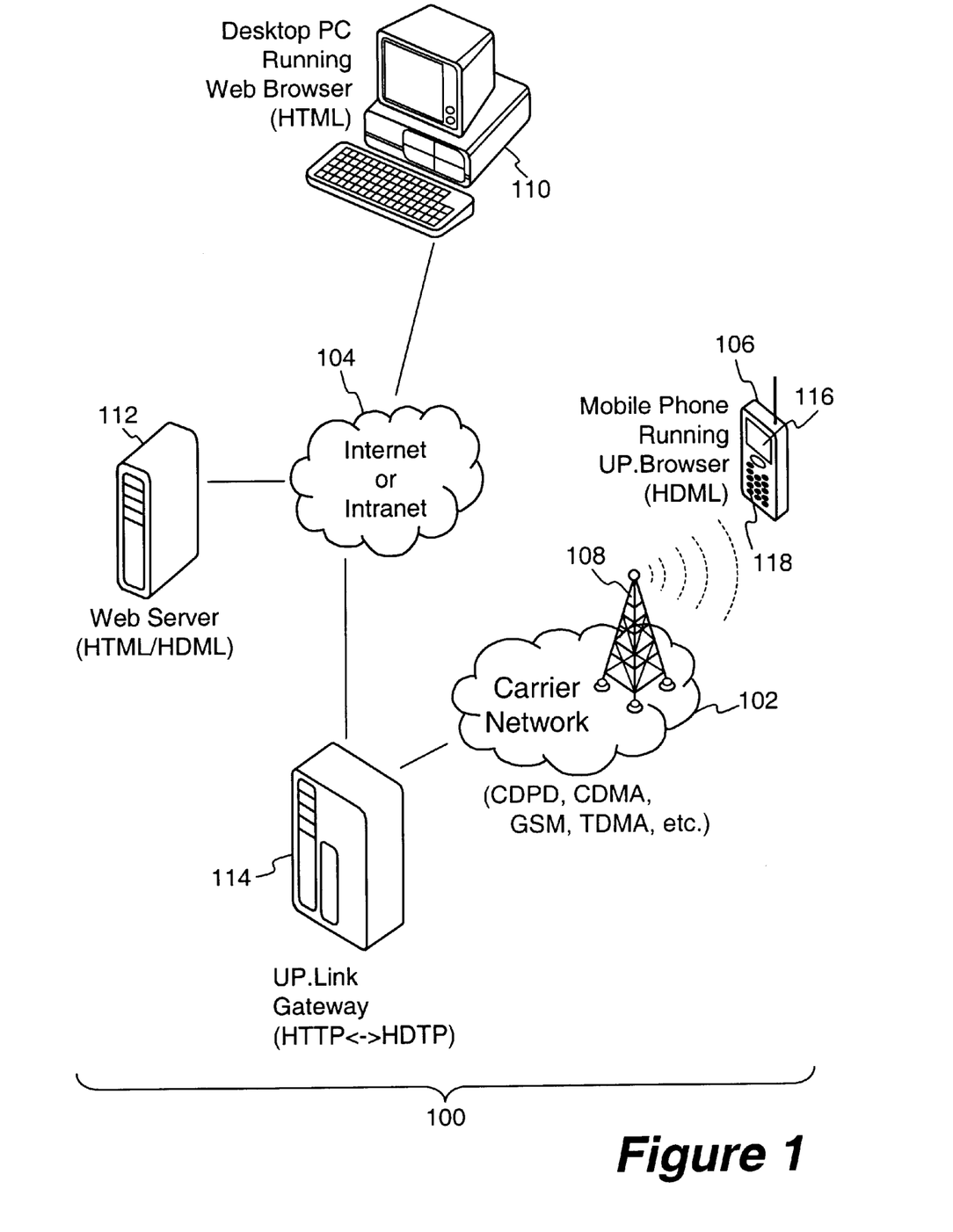
FIG. 1 illustrates a schematic configuration in which the present invention may be practiced.

Referring now to the drawings, in which like numerals refer to like parts throughout the several views. FIG. 1 illustrates a schematic configuration in which the present invention may be practiced. A data network 100 comprises an airnet 102 that is generally called wireless network and a landnet 104 that is generally a landline network, each acting as a communication medium for data transmission therethrough. Airnet 102, in which the data transmission is via the air, is sometimes referred to as a carrier network as well because each airnet is controlled and operated by a carrier, for example AT&T and GTE, each having its own communication scheme, such as CDPD, CDMA, GSM and TDMA for airnet 102. The airnet 102 may comprise more than one different type of wireless network. For example, the airnet 102 may comprise a GSM wireless network for some wireless client devices and a CDPD wireless network for other wireless client devices.

Referenced by 106 is one of the two-way interactive communication devices that can be a mobile device, a cellular phone, a wireless personal digital assistant, or a wireless capable remote controller, capable of communicating, via airnet 102, with an antenna 108 that also represents a carrier infrastructure. It is generally understood that the carrier infrastructure or antenna 108 serves simultaneously a plurality of the two-way interactive communication devices, of which only one mobile device 106 is shown in the figure. Similarly, connected to Internet 104 are a plurality of desktop personal computers (PC) 110 and a number of information server computers 112 (such as web servers), though only one representative, respectively, is shown in the figure. PC 110, as shown in the figure, may be a personal computer SPL300 from NEC Technologies Inc. and runs a HTML Web browser via the Internet 104 using HTTP to access information stored in information server 112 that may be a workstation from Sun Microsystems Inc. It is understood to those skilled in the art that PC 110 can store accessible information therein so as to become a information server as well.

Between the Internet 104 and the airnet 102 there is a link infrastructure that comprises a proxy server device 114 and the carrier infrastructure 108. Proxy server device 114, also referred to as proxy server or gateway server, may be a workstation or a personal computer and performs mapping or translation functions. For example, the proxy server may map from one network protocol to another network protocol. Using the proxy server 114, the mobile device 106 may communicate with any one of the computer servers 112 or the PCs 110 on the Internet via the carrier infrastructure 108.

The wireless carrier infrastructure 108 generally comprises a base station and an operation center for each type of wireless network supported. The base station controls radio or telecommunication links with the mobile devices. The operation and maintenance center comprises a mobile switching center performing the switching of calls between the mobile devices and other fixed or mobile network users. Further, the operation and maintenance center manages mobile services, such as authentication and oversees the proper operation and setup of a wireless network. Each of the hardware components and processes in the base station and the operation and maintenance center for each type of wireless network is known to those skilled in the art and not to be described herein to avoid unnecessarily obscuring aspects of the present invention.

The communication protocol of the World Wide Web (WWW) on the Internet 104 is the well known HyperText Transport Protocol (HTTP) or HTTPS, a secure version of HTTP. HTTP runs on top of the Transport Control Protocol (TCP) and the Internet Protocol (IP). HTTP us used to control the connection of a well known HyperText Markup Language Web browser, or HTML Web browser in PC 110, to Web server 112, and the exchange of information therebetween.

The communication protocol between mobile computing device 106 and proxy server 114 via airnet 102 is Handheld Device Transport Protocol (HDTP), which preferably runs on User Datagram Protocol (UDP). HDTP is used to control the connection of a HDML Web browser in mobile device 106 to proxy server 114. HDML refers to Handheld Device Markup Language, a markup language similar to HTML. HDML is a tag based document language and comprises a set of commands or statements specified in a card that specifies how information is to be displayed on a small screen of the mobile device 106. Normally a number of cards are grouped into a deck that is the smallest unit of HDML information that can be exchanged between the mobile device 106 and the proxy server 114. The specifications of HDTP, entitled "HDTP Specification" and HDML, entitled "HDML 2.0 Language Reference" are enclosed and incorporated herein by reference in their entirety.

HDTP is a session-level protocol that resembles HTTP, but incurs less overhead since HDTP uses UDP instead of TCP. HDTP is highly optimized for use in thin client devices, such as mobile computing devices including cellular phones and personal digital assistants. Mobile computing devices typically have significantly less computing power and memory than a desktop personal computers. Further, it is understood to those skilled in the art that UDP does not require a connection to be negotiated between a client and a server before information can be exchanged. Thus, using UDP eliminates the need of exchanging a large number of packets during a session creation between a client and a server. Exchanging a very small number of packets is one of the desired features for a mobile device with very limited computing power and memory in order to effectively interact with a landline device.

A Wireless Computing Device

To facilitate the description of the disclosed system, some of the features in mobile computing device 106 are recited.

According to one embodiment, mobile computing device 106 is a mobile phone. Mobile phone 106 comprises a display screen 116 and a keyboard pad 118 that allow a user thereof to communicate interactively with the mobile phone. The digital hardware components including a microcontroller, a ROM, and RAM in mobile phone 106 are known to those skilled in the art.

The compiled and linked processes are typically stored in the ROM as a client module that causes mobile device 106 to communicate with proxy server 114. With display screen 116 and keypad 118, a user of mobile device 106 can interactively communicate with proxy server 114 over airnet 102. Upon activation of a predetermined key sequence utilizing keypad 118, for example, the microcontroller initiates a communication session request to proxy server 114 using the client module in the ROM. Upon establishing the communication session, mobile device 106 typically receives a single HDML deck from proxy server 114 and stores the deck as cached in the RAM. As described above, an HDML deck comprises one or more cards. Each card includes the information required to generate a screen display on display screen 116. The number of cards in a card deck is selected to facilitate efficient use of the resources in mobile device 106 and in airnet network 102.

Internet Proxy For A Wireless Data Network

Figure 2:
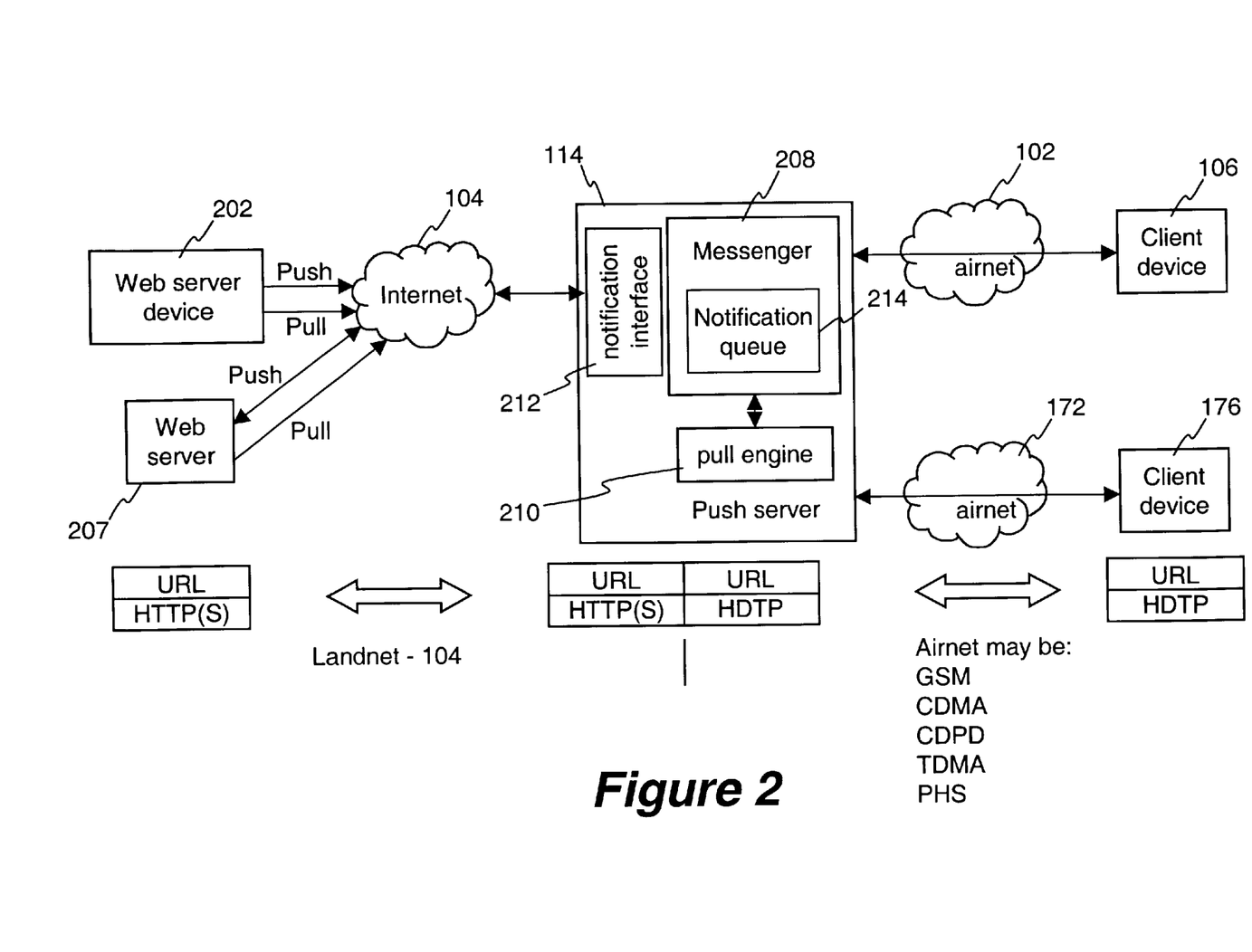
FIG. 2 illustrates a functional diagram of the disclosed system in the present invention.

Referring now to FIG. 2, there is shown a functional block diagram of the disclosed system. Web server devices 202 and 207 provide information accessible to other computing devices on the Internet 104. A first mobile device 106 accesses the information in the web server devices 202 and 207 via proxy server device 114 through first wireless network 102. FIG. 2 further illustrates a second mobile device 176 that accesses the information in web server devices 202 and 207 via proxy server device 114 through a second wireless network 172 that has different properties than the first wireless network 102. Thus, proxy server 114 is responsible for communicating with several wireless clients that communicate using different wireless infrastructures.

To avoid possible ambiguities in further description of the present invention, each server device, such as web server devices 202 and 207 and proxy server device 114, refers to a piece of hardware equipment that comprises one or more microprocessors, working memory, buses and necessary interface and other components that are familiar to those skilled in the art while a server module means compiled and linked processes of the disclosed system loaded into the working memory to perform designated functions, according to the invention, through the parts and components in the server device. Additional details on the design, construction, and operation of one possible proxy server embodiment is described in U.S. patent application Ser. No. 09/070,668, entitled "Method and Apparatus for Providing Network Access over Different Wireless Networks", filed on Apr. 30, 1998, which issued as U.S. Pat. No. 6,314,108 on Nov. 6, 2001and which is incorporated herein by reference in its entirety.

Push Data Delivery

As set forth in the background, there are times when the user of a mobile computing device may wish to "subscribe" to a particular web page on an Internet server in order to receive updates. For example, referring to FIG. 2, if the user of a mobile device 106 or mobile device 176 wishes to be informed about updates to a particular web page on web server 202, then the user may "subscribe" to that particular web page.

As part of the subscription process with a particular Web server, the subscriber ID of the mobile computing device is recorded. The recording of the subscriber ID enables the Web service provider or the Web server 202, to notify the user of mobile device 106 of any changes made to the particular web pages that are subscribed to by the user of mobile device 106. After mobile device 106 subscribes, Web server device 202 pushes a notification when there is a change to the particular web page subscribed to by mobile computing device 106. Accessible information is generally presented in hierarchical pages of hyperlinked HDML pages and each of the HDML pages is identified by a distinct address, such as a universal resource locator (URL). The web server device 202 sends the notification, possibly including the address of the updated page, to the proxy server 114. The proxy server 114 will then relay this notification to the wireless mobile device 106 at an appropriate time. For example, the proxy server could send the notification to the wireless mobile device when it is powered on and accesses the wireless network. Thus, the proxy server 114 acts as a push server for the wireless mobile devices that use the wireless networks coupled to the proxy server 114. In this document, the portions of the proxy server 114 that perform information pushing will be referred to as a "push server" 114.

Figure 3:
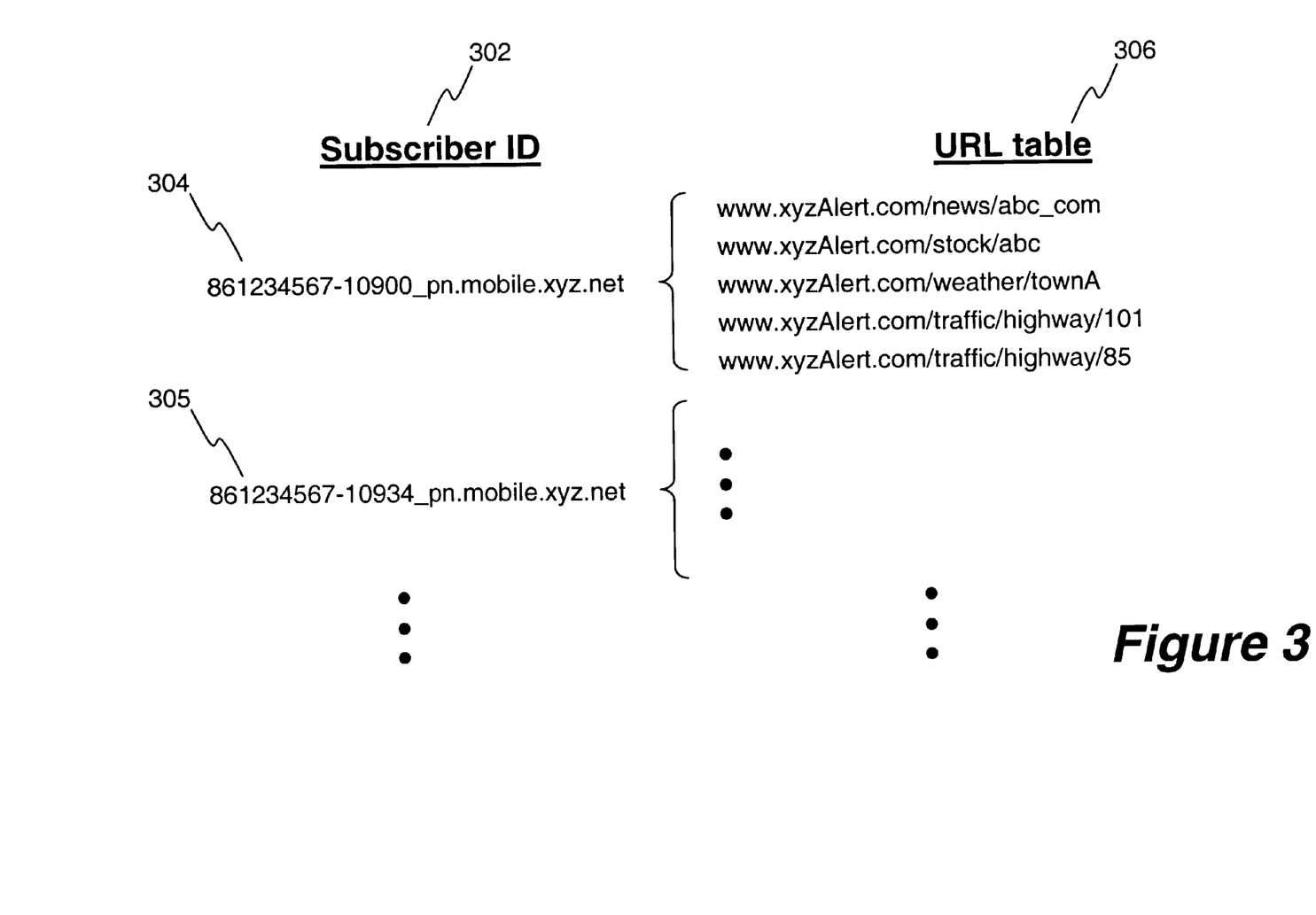
FIG. 3 illustrates a database of subscriber IDs and associated URLs in a Web server.

FIG. 3 illustrates a typical table maintained in a Web server that allows web page subscriptions and provides notifications when subscribed web pages are modified. Referring to the table in FIG. 3, a subscriber ID list 302 maintains a list of subscriber IDs of the mobile devices through which the users desire to fetch information from the Web server and be informed of any changes to the particular pages. Associated with each subscriber in list 302 is a table of web pages to which the subscriber has "subscribed." As shown in FIG. 3, a subscriber with subscriber ID 861234567-10900_pn.mobile.xyz.net (304) subscribes to several web pages available on the web site at server www.xyzAlert.com. For example, the subscriber with subscriber ID 861234567-10900_pn.mobile.xyz.net (304) subscribes to a web page in the directory /stock/abc on web server www.xyzAlert.com that displays information on a company with the ticker symbol "ABC".

The URLs representing the information subscribed to by the user are grouped and maintained in URL table 306. It can be appreciated that subscriber ID list 302 generally maintains a plurality of subscriber IDs, each corresponding to one mobile device, typically one user thereof. Similarly, URL table 306 maintains a plurality of groups of URLs. Each group of URLs is associated with one mobile device. The URLs represent information subscribed by the mobile device's user. When the Web server updates information in certain pages, URL table 306 is examined to see if any URLs match the modified news page. When a match is detected, the corresponding subscriber IDs in subscriber ID list 302 are sent notifications that inform the user about the updated information. For example, if a press release from ABC Company is added into the web page located by the URL www.xyzAlert.com/stock/abc then the subscriber with subscriber ID 861234567-10900_pn.mobile.xyz.net (304) will be sent a notification. Notifications inform the interested subscriber that the subscribed news has been updated.

There are many other applications to a notification system. For example, an email server may have a destination mailbox for a wireless client device. When email is delivered to the mailbox on the mail server, the mail server may use a notification to notify the wireless client device of the incoming email. In another application, a systems administrator may program an important server system to send out urgent messages when the important server encounters difficulties. The systems administrator could program the server monitor program to send notifications when trouble is detected.

Referring back to FIG. 2, when an Internet server device 202 has an update to information subscribed to by several wireless client devices, the Internet server 202 needs to send several notifications to inform the several client devices that an update has occurred. However, the several wireless client devices, such as wireless client devices 106 and 176, may be connected to different wireless networks having different characteristics, such as CDMA, CDPD, and GSM. To simplify the notification task, push server 114 presents a single unified notification interface 212 that is used to serve several wireless client devices (106 and 176) connected to several different wireless networks (102 and 172) having different characteristics, such as CDMA, CDPD, and GSM.

The notification sent by web server 202 must be properly formulated in order to be processed by push server 114. In one embodiment, there are four main requests types that may be made from a web server to the push server 114. The first type of request is an "add notification" request used to push a notification. The other three types of requests, delete notification request, notification status request, and a clear notifications request, are maintenance requests. The delete notification request allows Internet hosts to delete previously added notifications that have not yet been delivered to a particular subscriber. The notification status request allows an Internet host to check on the status of a previously added notification. Finally, the clear notifications request allows an Internet host to clear all the notifications that have been sent but not yet delivered to a particular subscriber.

Add Notification Request

Add notification requests are used by any information server that wishes to send information to wireless client devices. An add notification request contains the information to be delivered, an address of the information to be delivered, or both. The push server will respond to a proper add notification request by placing a notification in a notification queue. For future reference, the push server stores the authenticated domain name of the entity that sent the add notification request along with the notification.

Notification Status Request

After an Internet server has sent an add notification request to a push server, the Internet server can check the status of the notification request by sending a notification status request. Both pending (notifications that have not yet been delivered) and completed (delivered) notifications may be queried.

Delete Notification Request

After an Internet server has sent an add notification request, the Internet server may later decide to cancel the delivery of the notification. To delete a notification, an Internet server sends the push server a properly formatted delete notification request to the push server. Only pending notifications may be deleted.

Clear Notification Request

An Internet server may also clear all notifications that are pending for a particular subscriber and fall within a particular content domain by using a "clear notifications" request. A content domain is defined as the Internet domain of the content provider. The push server responds to clear notifications requests by finding all notifications that have a matching subscriber ID and that originated from a matching content location domain. Only pending notifications may be cleared. Notifications that have already been delivered will not be affected.

Additional details on the formatting of communication between information servers and the push server is described in U.S. patent application entitled "Method and Apparatus for Informing Wireless Clients about Updated Information", having application Ser. No. 09/071,377 filed on Apr. 30, 1998 which is incorporated herein by reference in its entirety.

Authenticating Notification Requests

As set forth in the preceding sections, a push server (or proxy server) gives other computers coupled to the Internet the ability to send notifications to wireless client devices that the push server serves. Furthermore, these computers coupled to the Internet may query status, delete, and clear notifications sent to wireless devices. However, a malicious attacker may attempt to abuse these capabilities.

For example, a attacker may attempt to send many notifications to a push server in an attempt to overwhelm that particular push server. Such an attack is known as a denial of service attack. Furthermore, an malicious attacker may attempt to query the status of notifications sent to a particular wireless client device subscriber in an attempt to learn about the interests of that subscriber. Such an attack would be a breach of the privacy of the subscriber.

To safeguard against such malicious attacks, the present invention introduces security mechanisms for a push server. The security mechanisms limit the access to the information pushing capabilities of a push server. Specifically, the push server portion of a proxy server will authenticate all requests and make sure the authenticated entity is trusted to ensure that a malicious attacker does not abuse the push server.

Authentication Using Certificates

In one embodiment, the push server authenticates requests by requiring all requests to be performed using the HyperText Transport Protocol Secure (HTTPS) protocol and to provide a certificate. The HTTPS protocol employs the Secure Socket Layer (SSL) protocol. The Secure Socket Layer protocol encrypts communication between the two parties such that privacy is ensured.

The Secure Socket Layer supports the use of X.509 certificates. An X.509 certificate is a digital document that is used to authenticate a particular party. Certificates are issued by an organization known as a Certificate Authority (CA). A Certificate Authority performs various audits in order to ascertain that a particular entity requesting a certificate really has the authority to obtain the requested certificate. Once the Certificate Authority is convinced, the Certificate Authority issues a certificate to that entity. The certificate contains a digital signature that is nearly impossible to forge.

One type of certificate is a "site certificate." A site certificate is a certificate that is issued to a particular Internet domain name (i.e., a web site). For example, the Internet domain www.unwiredplanet.com may be issued a site certificate such that the Internet web site located using URL http://www.unwiredplanet.com/ can prove that it is really the official site for Unwired Planet, Inc.

For example, when a web browser connects to the Internet web site at http://www.unwiredplanet.com/, the web browser may request a certificate. The http://www.unwiredplanet.com/ Internet web site responds by providing the site certificate. The web browser extracts a domain name from the site certificate and verifies that it is the same as the domain name contained in the URL used to address the site. If the domain name extracted from the site certificate matches the URL used to address the site, then the site is authentic. This type of verification is used to prevent DNS spoofing. DNS spoofing occurs when a malicious attacker adulterates DNS records to make a domain name point to an incorrect Internet Protocol (IP) address.

The present invention uses site certificates to authenticate access to a push server. Specifically, all information servers that wish to send a notification request to a push server must provide a site certificate.

For example, when a web server that accepts subscriptions to its web pages needs to send out a notification due to a web page change, the web server provides its site certificate along with the notification request such that the push server may authenticate the web server. The push server first test the site certificate to ensure that it is valid. Then the push server examines the site certificate to determine the identity of the requester. Specifically, the push server extracts a domain name from the site certificate. The push server may then accept or deny the request depending on the identity of the requestor.

Figure 4:
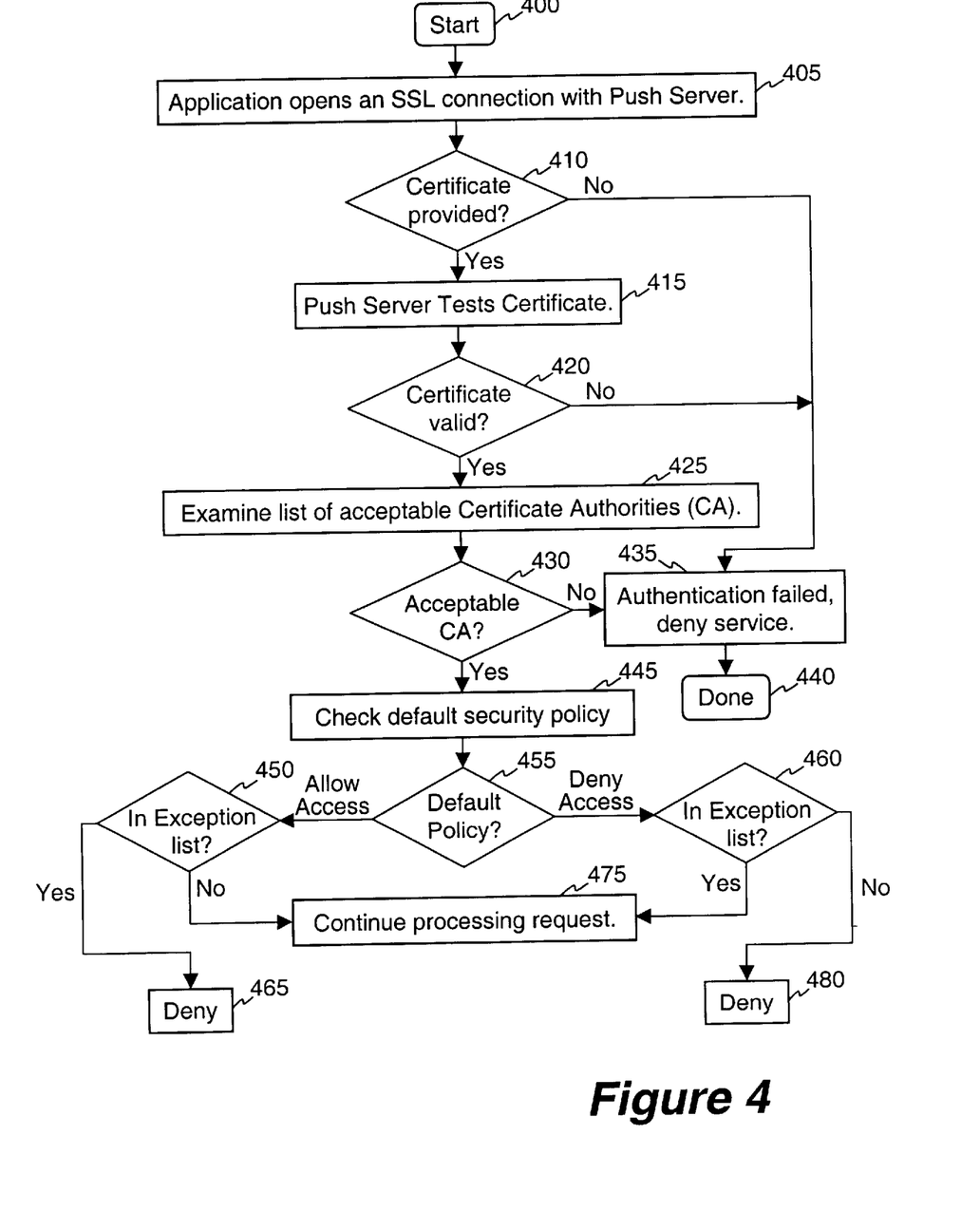
FIG. 4 illustrates a flow diagram describing how an information server authenticates itself to a push server.

FIG. 4 illustrates a flow diagram describing one embodiment of how a push server with authentication may be implemented. FIG. 4 describes how a information server that wishes to send a request to a push server negotiates and authenticates a connection with the push server.

Referring to step 405, an application on the information server that wishes to push information initiates an SSL connection to a push server. The push server then examines the SSL connection at step 410 to see if an X.509 certificate was provided. If no X.509 certificate was provided, then the push server, at step 435, denies services to the entity that initiated the connection.

If the entity that initiated a connection with the push server provided an X.509 certificate, then the push server tests the X.509 certificate at step 415. Specifically, the push server performs certain tests to determine the integrity of the X.509 certificate. If the X.509 certificate is valid, then the sender can be trusted to be associated with the domain name identified in the site certificate.

Trusted Certificate Authority Check

The fact that an entity provides an X.509 certificate does not mean that the site is authentic. Specifically, a rogue entity may create its own Certificate Authority that issues erroneous certificates. To prevent such bogus certificates from being accepted, the push server maintains a list of Certificate Authorities that the push server trusts. The push server of the present invention consults the list of acceptable Certificate Authorities at step 430 to determine if a trusted Certificate Authority issued the X.509 certificate. If the X.509 certificate that was provided by an entity initiating a connection is not from an acceptable Certificate Authority as detected at step 430, then the push server denies services to the entity that initiated the connection at step 435.

In one embodiment of the present invention, the list of acceptable Certificate Authorities is stored as a database of Certificates from the acceptable Certificate Authorities. The database of certificates may be edited by an operator of the push server using a standard web browser. The operator can add or remove certificates as deemed necessary. Furthermore, the operator can mark certificates in the database as being acceptable or unacceptable certificates.

Access Control System Check

Once a request has passed the X.509 certificate test and the acceptable Certificate Authority test, the push server then passes the request to an access control system. The access control system determines if a request from an authenticated entity should be processed. The access control system operates using the domain name provided in the site certificate from the connecting entity since that domain name has been authenticated.

In one particular embodiment of the present invention, the access control system implements a default security policy that is set to either generally allow or deny access. However, a list of exceptions to the default security policy is also maintained. The security policy exception list or access control list comprises a list of domain names of information servers. Referring back to FIG. 4, the default security policy is tested at step 445 after a connecting entity has been authenticated.

If the default security policy is to allow access, then the access control system will process any request from authenticated entities that are not in an exception list as set forth in steps 450 and 475. However, if the default security policy is to allow access and the authenticated entity is in the exception list, then the access control system will deny the request as set forth in steps 450 and 465.

If the default security policy is set to deny access, then the access control system will deny the request unless the authenticated entity is in an exception list as set forth in step 460 and 480. If the default security policy is set to deny access and authenticated entity is in the exception list, then the request is processed as set forth in steps 460 and 475. The access control system described in FIG. 4 is for illustrative purposes only. Other types of access control systems may be used.

Limiting The Content Of Notification Requests

To limit abuse by malicious attackers that have obtained control of an entity allowed to send requests to the push server, the push server strictly limits the content of notifications and maintenance requests. Specifically, all maintenance requests from a particular entity can only affect notifications sent from the same entity and all new notifications sent from an authorized authenticated entity can only refer to information from a site closely associated with the domain name identified in the certificate.

As set forth earlier, there are currently four types of requests that may be presented to the push server of the present invention. The first type of request is an "add notification" request used to send a notification to a wireless client through the push server. The add notification request may include an identifier that is used to identify the notification for future reference. If no identifier is sent along with a notification request, the push server may use some other string from the notification request sent to server to serve as an identifier for the notification. In one embodiment, a URL in notification field may be used as an identifier for the notification.

The other three types of requests (delete notification requests, notification status requests, and clear notifications requests) are maintenance requests that affect notifications that were sent earlier. In the case of delete and status maintenance requests, the maintenance request may include a notification identifier that is compared against identifiers in existing notifications. Only notifications with matching identifiers are affected by delete and status maintenance requests. A clear notifications request is used to clear all pending notifications for a particular subscriber limited by content domain. The subscriber is identified with a subscriber identification value.

Maintenance Request Content Security

Maintenance requests provide a significant amount of power to an information service provider that communicates with a push server. Specifically, maintenance requests can be used to delete individual notifications or all notifications sent to a particular subscriber. Furthermore, a notification status maintenance request can be used learn about existing notifications for a particular subscriber. To prevent this power from being abused, the present invention allows an entity's maintenance requests to only affect notifications that were originally sent by the same entity.

To ensure that an entity's maintenance requests are only processed on notifications sent by that exact same entity, the present invention requires that the domain name of the entity sending a maintenance request match the domain name of the entity that originally sent the matching notification. The domain names that are compared are obtained from the site certificate sent along with the original add notification request and the site certificate that accompanied the current maintenance request.

New Notification Content Security

The present invention also examines the content of new notifications. Specifically, the push server examines notifications to see if any Uniform Resource Locators (URLs) are referenced in new notification requests. If any URLs are referred to, those URLs should be closely associated with the domain name of the entity that sent the notification request. The reason for this test is that an authorized authenticated entity should not be able to refer to information outside of its control.

For example, one type of notification that may be sent is an "alert" that notifies the user of an important event. An alert consists of a brief text title, a URL, and a token that indicates how the user should be notified (i.e. a beep, flash, vibration, etc.). Upon receiving an alert, the client software in the wireless device places the text title into a status page dedicated to alerts. The client software also links the text title to the URL that was provided. The user may subsequently select the title text and therefore request the content associated with the linked URL. A malicious entity could abuse this feature by sending an alert with a "new email" text title and providing a URL that points to a list of forged email messages. The user would thus be tricked into viewing a set of false email messages.

An attacker could also abuse the notification feature by sending a flood of notification requests that refer to a URL associated with a third party's server that the attacker wishes to attack. This flood of notifications would cause the push server to repetitively access the specified URL thereby degrading the performance of the server associated with the URL. Therefore, the flood of notifications would constitute a denial of service attack that would degrade the operation of the third party's site.

An attacker could also abuse the notification feature by sending bogus cache invalidation requests. Each wireless client device has a cache that stores information that the wireless client device has received. In one embodiment, each piece of stored information may be associated with a URL where the piece of information originated. An attacker could send notification requests that perform cache invalidation on a URL outside of the domain of the attacker. This cache invalidation request would invalidate valid information stored in the wireless client device. Such an attack would degrade the performance of the wireless client device (by invalidating valid information), the push server (by having to process the bogus notification), and the server associated with the URL (since an unnecessary cache update would be performed).

To prevent such abuses, the present invention only allows a notification to reference servers closely associated with the domain name listed in the certificate that accompanied the notification requested. One embodiment of the present invention requires new notifications to refer only to information located within the specific domain name identified in the certificate that accompanied the request or an immediate superdomain of the specific domain name identified in the certificate that accompanied the request. For example, if a a new notification request is accompanied by a site certificate that identifies the internet domain name "push.www.unwiredplanet.com" as the sender, then the following URLs may be placed in the notification:

http://push.www.unwiredplanet.com/info.txt (the same domain name)

https://www.unwiredplanet.com/abc (the superdomain)

However, the following URLs would not be acceptable:

http://home.www.unwiredplanet.com/push.txt (different domain)

https://unwiredplanet.com push.html (not the immediate superdomain)

This requirement will prevent an authorized authenticated entity from sending information located in a site outside of their control.

In one embodiment of the present invention, there are two different types of notifications: Pull notifications and Push notifications. Pull notifications refer to updated information that exists at a location that is specified using a URL. The URL is specified in a header field of the request. Push notifications contain a information payload that specifies updated information. However, the information payload of a push notification may include a URL that refers to outside information. Thus, both push and pull notifications must be checked.

To verify the content of notifications in an embodiment that uses both push and pull notifications, the present invention puts limitations on the URLs that may be used in the add notification request. Specifically, all URLs in a header field must be absolute and complete through the net_loc portion such that a domain name can be extracted from the URL and compared with a domain name from the site certificate. The net_loc portion, as defined in the Internet Engineering Task Force's (IETF) Request For Comments (RFC) document number 1808, is the domain name address portion of an internet server. For example, in the following Uniform Resource Locator (URL):

http://www.unwiredplanet.com/index.html

The www.unwiredplanet.com section of the Uniform Resource Locator (URL) is the net_loc portion of the URL. Furthermore, any URLs in the body of a push notification should be relative URLs such that those relative URLs are combined with the absolute URL in the header which was tested as set forth above.

Content Verification Embodiment

Figure 5:
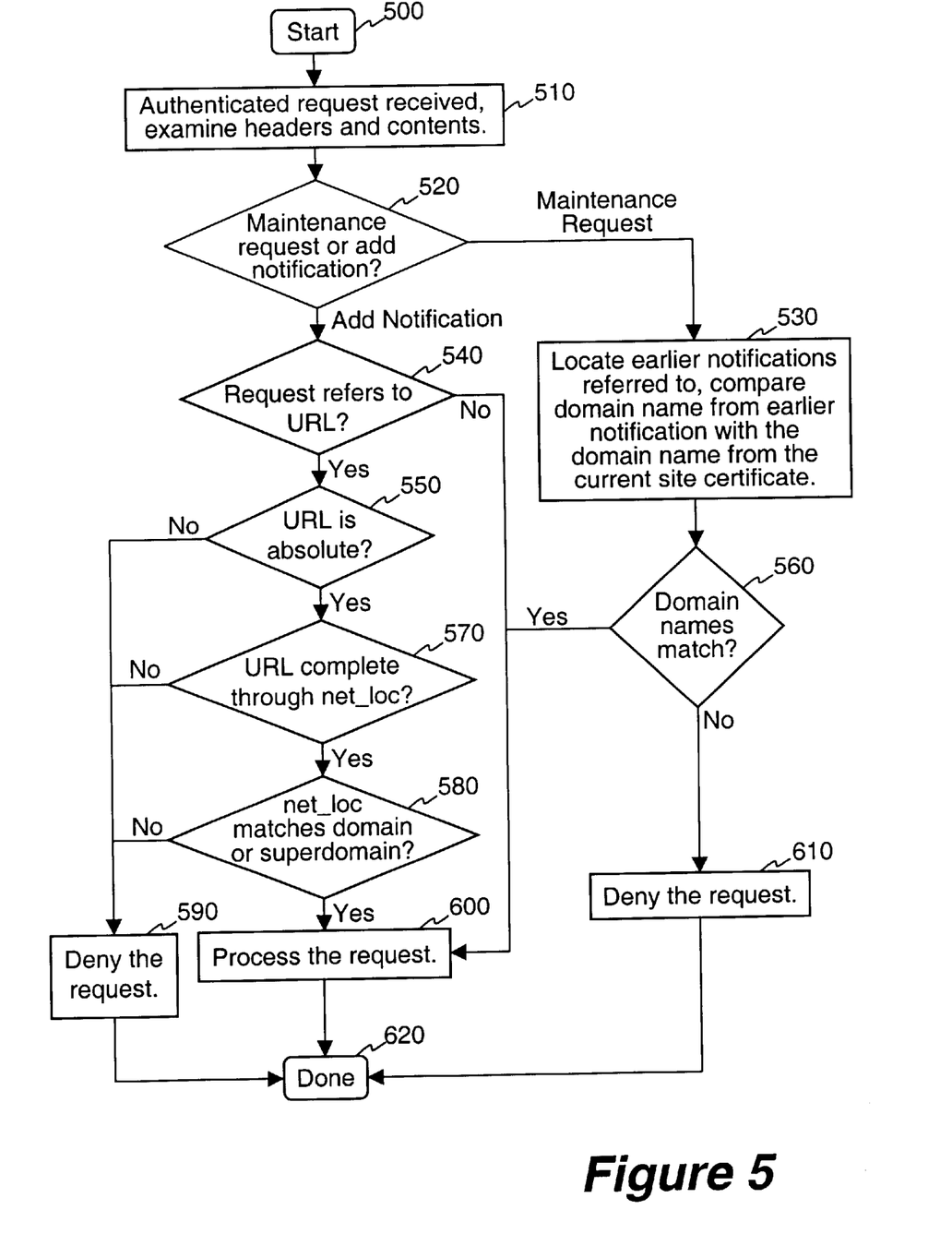
FIG. 5 illustrates a flow diagram describing how a push server checks the content of notifications and maintenance requests.

FIG. 5 illustrates a flow diagram of one possible embodiment of a push server system that ensures that the content of new notifications and maintenance requests are legitimate. It should be noted that the embodiment of FIG. 5 represents only one possible method of implementing the teachings of the present invention. For example, the steps listed in FIG. 5 may be performed in different order than presented in FIG. 5.

Referring to step 510 of FIG. 5, an authorized authenticated request has been received at a push server. The contents of the authorized authenticated request are examined to see if the request is a maintenance request that may refer to one or more earlier notifications or if the request is an add notification request that may refer to a URL that needs to be tested.

If, at step 520, the push server determines that the request is a maintenance request that may refer to one or more earlier notifications, then the push server proceeds to step 530. At step 530, the push server attempts to locate any previous notifications that the maintenance request concerns. Detailed information on how the push server locates earlier notifications can be found in the parent U.S. patent application entitled "Method and Apparatus for Informing Wireless Clients about Updated Information" having Ser. No. 09/071,377 filed on Apr. 30, 1998 which is hereby incorporated by reference. If no matching notification is found, then the push server informs the requestor that no matching notification was found.

Assuming that at least one matching notification was found, then the push server, at step 560, compares the domain name associated with the matching notification with the domain name from the site certificate accompanying the maintenance request. Note that the domain name from the site certificate that accompanied the add notification request that created the matching notification was stored along with the notification. If the two domain names match exactly, then the maintenance request will be processed at step 600. Otherwise, if the domain names do not match, then the maintenance request is denied at step 610.

Referring back to step 520, if the request is a new add notification request then the push server proceeds to step 540. Each new add notification request must be examined to be sure that the notification does not refer to information outside of the sender's control. In the particular embodiment of FIG. 5, the push server ensures that all Uniform Resource Locators (URLs) in a notification are closely associated with the domain name of the entity that sent the notification request. In one embodiment that will be described, absolute URLs in header fields are tested and any URLs within a body of a notification request must only contain relative URLs that will be completed using an absolute URL in the header.

At step 540, the push server determines if there are any Uniform Resource Locators (URLs) in the header of the new notification request. If there are no URLs in the new notification request, then the push server proceeds to step 600 and processes the new notification request.

If there is a URL in the new notification request, then that URL needs to be checked. Step 550 tests to see if an absolute URL is provided. If the URL is not absolute, then the request is denied at step 590.

After determining that the Uniform Resource Locator (URLs) is absolute, step 570 tests to see if the URL is complete through the net_loc portion of a URL. If the enclosed URL does not include a non-empty and well-formed net_loc portion, then the request is denied at step 590. The request is denied since without a net_loc, the push server will not be able to verify that the URL is closely associated with the domain name that has already been authenticated.

Finally, if the URL in the new notification is absolute and includes a net_loc, then the push server compares the net_loc with the domain name that was obtained from the site certificate that accompanied the new add notification request. The net_loc must be closely associated with the authenticated domain name from the site certificate. In one embodiment, the Internet address must match the immediate domain name identified in the site certificate or the immediate superdomain of the domain name identified in the certificate.

Step 580 performs the step of comparing the net loc portion of the URL. If the net_loc does not exactly match the domain name identified in the certificate or the superdomain of the domain name identified in the certificate, then the request is denied at step 590. Note that the comparison is case insensitive. If the net_loc matches either the domain name identified in the site certificate or the superdomain of the domain name identified in the site certificate, then the request is processed at step 600.

The present invention has been described in sufficient detail with a certain degree of particularity. However, it is understood to those skilled in the art that the present disclosure of embodiments has been made by way of example only and that numerous changes in the arrangement and combination of parts as well as steps may be resorted without departing from the spirit and scope of the invention as claimed.

We claim:

1. A method of delivering notifications from an information server to a push server, said push server for sending information to a plurality of subscribing clients, said method comprising:

receiving in said push server a push request from said information server, said push request including a certificate from said information server;

authenticating said information server by
validating the integrity of said certificate, and determining if said certificate was issued from an acceptable certificate authority in an acceptable certificate authority list;

processing said push request in said push server if said certificate was issued by an acceptable certificate authority in said acceptable certificate authority list and said certificate was validated; and pushing updated information in said push request to a thin-client system if said push request contains said updated information and said processing succeeded, said thin-client device only communicating with said information server through said push server.

2. The method as claimed in claim 1 further comprising:

verifying that said push request refers to information that originates from a server within a domain closely associated with said information server.

3. The method as claimed in claim 1 wherein processing said push request comprises:

examining a default security policy; and allowing said push request if said default policy is to allow access else denying said push request if said default policy is to deny access.

4. The method as claimed in claim 3 wherein processing said push request comprises:

examining an access control list; and allowing said push request if said default policy is to deny access and said information server is listed in said access control exception list.

5. The method as claimed in claim 1 wherein processing said push request comprises:

examining an access control list; and allowing or denying said push request depending on if said information server is in said access control list.

6. The method as claimed in claim 1 wherein processing said push request comprises sending a notification across a wireless network to a wireless thin-client device.

7. The method as claimed in claim 1 wherein receiving in said push server a push request from said information server comprises receiving an SSL connection from said information server directed to said push server.

8. The method as claimed in claim 1 wherein said certificate comprises an X.509 digital certificate.

9. The method as claimed in claim 1 further comprising:

determining if said push request refers to an earlier push request; and verifying that said push request comes from a same entity that sent said earlier push request if said push request refers to said earlier push request.

10. The method as claimed in claim 1 further comprising:

examining a URL in said push request; and rejecting said push request if said URL refers to a domain not closely associated with a domain name in said certificate.

11. The method as claimed in claim 10 wherein rejecting said push request if said request contains a URL that refers to a reference domain name not closely associated with said domain name in said certificate comprises requiring a net_loc of said URL to be said domain name or an immediate superdomain of said domain name.

12. The method as claimed in claim 1 further comprising:

examining said push request to determine if said request contains a URL; and rejecting said push request if said URL is not absolute or does not contain a net_loc.

13. An apparatus for delivering notifications to a set of wireless thin-client devices on a wireless network, said apparatus comprising:

a computer network;

an information server, said information server coupled to said computer network, said information server for pushing information to a plurality of clients, said information server having a site certificate; and a push server, said push server coupled to said wireless network, said push server coupled to said computer network, said push server accepting push requests that include said site certificate from said information server, said push server verifying said site certificate and processing each said push request after validating the integrity of said site certificate, said push server pushing a piece of information to at least one of said wireless thin-client devices if said validation succeeded and said push request included said piece of information, said thin-client device only communicating with said information server through said push server.

14. The apparatus as claimed in claim 13 wherein said push server further verifies that said site certificate was issued by an acceptable certificate authority.

15. The apparatus as claimed in claim 13 wherein said computer network comprises the global Internet.

16. The apparatus as claimed in claim 13 wherein said certificate comprises an X.509 digital certificate delivered with an SSL connection.

17. The apparatus as claimed in claim 13 wherein said push server examines said push request to determine if said request refers to an earlier push request and verifies that said push request comes from a same entity that sent said earlier push request if said push request refers to said earlier push request.

18. The apparatus as claimed in claim 13 wherein said push server further verifies that said push request does not refer to a reference domain name not closely related to a domain name identified in said site certificate.

19. The apparatus as claimed in claim 18 wherein said push server rejects said push request if said push request contains a URL that does not match said domain name identified in said site certificate or an immediate superdomain of said domain name identified in said site certificate.

20. A method of delivering notifications from an information server to a thin-client system through a push server, said method comprising:

receiving in said push server a push request from said information server having updated information;

authenticating said information server with said push server;

verifying that a content of said push request originates from an acceptable source; and pushing said updated information in said push request to said thin-client system if said push request contains said updated information, said thin-client device only communicating with said information server through said push server.

21. The method as claimed in claim 20 wherein authenticating said information server comprises verifying a certificate.

22. The method as claimed in claim 21 wherein said certificate comprises an X.509 digital certificate.

23. The method as claimed in claim 21 wherein authenticating said information server further comprises verifying that said certificate was issued by an acceptable certificate authority.

24. The method as claimed in claim 20 wherein receiving in said push server a push request comprises receiving an SSL connection from said information server directed to said push server.

25. The method as claimed in claim 20 wherein verifying that a content of said push request originates from an acceptable source comprises:

examining said push request to see if said push request contains a URL; and rejecting said push request when said URL refers to a domain name not closely associated with an authenticated domain name in a certificate.

26. The method as claimed in claim 25 wherein rejecting said push request when said URL refers to a domain name not closely associated with said authenticated domain name in a certificate comprises requiring said URL to be said authenticated domain name or an immediate superdomain of said authenticated domain name.

27. The method as claimed in claim 20 further comprising:

examining if said push request refers to an earlier push request; and verifying that said push request comes from a same entity that sent said earlier push request if said push request refers to said earlier push request.

28. The method as claimed in claim 20 further comprising:

examining an access control list; and processing or denying said push request depending on if a domain name associated with said information server is in said access control list.

* * * * *